United States Patent [19]

Hay

[11] 4,061,617
[45] Dec. 6, 1977

[54] OXIDATION-REDUCTION DIPHENOQUINONE-DIPHENOHYDROQUINONE POLYMERS

[75] Inventor: Allan S. Hay, Schenectady, N.Y.

[73] Assignee: General Electric Company, Schenectady, N.Y.

[21] Appl. No.: 676,854

[22] Filed: Apr. 14, 1976

Related U.S. Application Data

[62] Division of Ser. No. 435,335, Jan. 21, 1974, Pat. No. 3,959,223.

[51] Int. Cl.$^2$ .................. C08L 65/02; C08L 71/04; C08F 4/50; C09K 15/00
[52] U.S. Cl. .................. 260/47 R; 260/2.1 R; 260/63 UY
[58] Field of Search ............ 260/47 R, 63 UY; 528/219

[56] References Cited

U.S. PATENT DOCUMENTS 3,631,208  12/1971  Hay .................. 260/47 R

FOREIGN PATENT DOCUMENTS 299,518  3/1971  U.S.S.R.
348,583  8/1972  U.S.S.R.

Primary Examiner—Joseph L. Schofer
Assistant Examiner—Peter F. Kulkosky, Jr.
Attorney, Agent, or Firm—F. Wesley Turner; Joseph T. Cohen; Jerome C. Squillaro

[57] ABSTRACT

Novel redox diphenoquinone-diphenohydroquinone polymers and derivatives thereof are described. The novel redox polymers are useful as oxidizing and reducing agents, antioxidants, stabilizers in dielectric compositions, semiconductor polymeric ingredients as well as redox ion exchange resins.

11 Claims, No Drawings

OXIDATION-REDUCTION DIPHENOQUINONE-DIPHENOHYDROQUINONE POLYMERS

This is a division of application Ser. No. 435,335, filed Jan. 21, 1974, now U.S. Pat. No. 3,959,223 issued May 26, 1976.

This invention relates to novel oxidation-reduction diphenoquinone-diphenohydroquinone polymers and derivatives thereof as well as to the methods for the preparation of the redox polymers and their derivatives.

The field of the redox polymers is quite large and comprises a class of polymeric materials whose polymer properties rest upon a relationship of "oxidation-reduction", or "redox", or "electron exchange" properties which have been studied only in great detail since about 1950. An excellent summary of the 1949-1965 state of the art with respect to oxidation-reduction polymers is set out in *Oxidation-Reduction Polymers* by Cassidy and Kun (1965) John Wiley & Sons, Inc.

As described in the prior art, quinone-hydroquinone redox polymers can be prepared by both addition polymerization and condensation reactions from monomeric materials as well as by reactions wherein the redox functional group, or a precursor, is attached covalently to an already-made polymeric structure. Usually in the preparation of redox type polymers derived from the polymerization of monomeric materials there is generally a guarantee of homogeneity with a concurrent determination of the location of the functional groups along the polymer backbone. Redox polymers prepared by the addition of the redox functional group to the already made polymer structure are usually less valuable than addition or condensation polymer types since the degree of homogeneity of the polymer is generally uncertain because of a lack of certainty as to the points of attachment of the redox functional groups on the polymer backbone structure. Accordingly, those skilled in the art who are interested in the commercial utility and application of redox polymers, are continuously interested in developing technological ability to prepare chemically reactive redox polymers having well characterized polymer structures, that can be prepared by simple, high yield reactions, and which are suitable or readily adaptable to the fundamental applications for redox polymers.

It is an object of this invention to provide redox polymers having well characterized polymer structures. Another object is to prepare redox polymers by simple reactions in high yield. Another object is to prepare redox polymers having controlled capacity, intensity, and reaction rates. Another object is to prepare substantially linear redox homopolymers which are soluble in water, acids and polar solvents. Another object is to prepare redox polymers which have anion and cation exchange groups placed on the polymeric matrices in order to permit adjustment of the hydrophilic nature of the redox polymers. Another object is to provide redox polymers having a high degree of mechanical and chemical stability including the retention of redox and ion exchange properties at elevated temperatures without degrading the polymer. Still another object is to provide redox polymers having a polymeric structure which is characterized by a high degree of homogeneity. These and other objects will be readily apparent from the following specification and the appended claims.

Essentially, my invention comprises discovery of (1) novel oxidation-reduction diphenoquinone-diphenohydroquinone polymers and derivatives thereof as well as (2) novel methods for the preparation thereof.

In general, the novel oxidation-reduction diphenoquinone polymers comprise compositions of matter which contain as at least the major portion of the polymer, diphenoquinone nuclei units selected from the group consisting of the formulas:

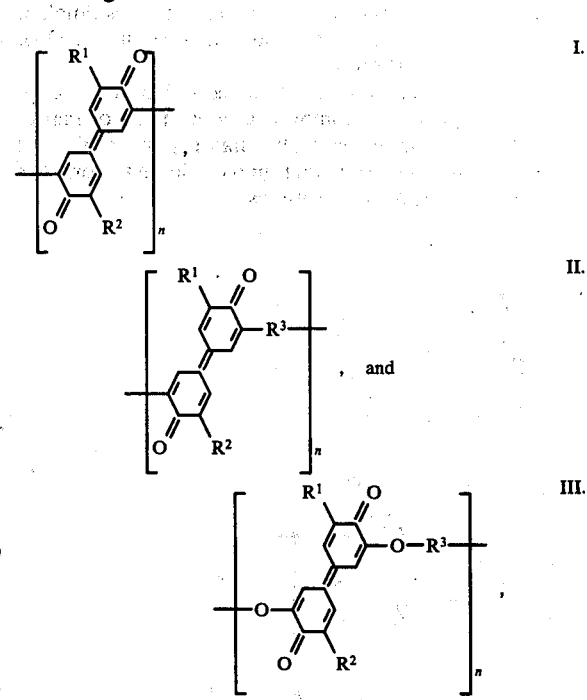

wherein $R^1$ and $R^2$ are selected from the group consisting of monovalent acyclic and cyclic hydrocarbon radicals, $R^3$ is selected from the group consisting of divalent acyclic and cyclic hydrocarbon radicals, and $n$ is a positive integer of at least 10.

Representative monovalent acyclic hydrocarbon radicals include the following: methyl, ethyl, n-propyl, isopropyl, n-butyl and its isomers, e.g. isobutyl, sec-butyl, tert-butyl, pentyl and its isomer forms, e.g. isopentyl, neopentyl, tert-pentyl, dodecyl and its isomeric forms, octadecyl and its isomer forms, tetracosyl and its isomeric forms, triacontyl and its isomer forms, etc.

Representative monovalent cyclic hydrocarbon radicals include the following: cyclopropyl, cyclohexyl, phenyl, o-tolyl, 2,3-xylyl-1, mesityl, m-cumenyl, 2-indenyl, 1-pyrenyl, 2-naphthyl, 2-anthryl, 2-phenanthryl, 4-biphenyl, 2-phenyl-7-naphthalenyl, etc.

Representative divalent acyclic hydrocarbon radicals include the following: methylene, ethylene, ethylidene, trimethylene, propylene, isopropylidene, tetramethylene, ethylethylene, pentamethylene, decamethylene, pentadecamethylene, eicosamethylene, etc.

Representative divalent cyclic hydrocarbon radicals include the following: 1,2-cyclopropylene, 1,2-cyclobutylene, 1,3-cyclopentylene, cyclopentylidene, 1,4-phenylene, 1,8-naphthalenylene, 2,6-anthracenylene, 2,9-naphthacenylene, etc.

Presently preferred classes of acyclic and cyclic hydrocarbon radicals or mixtures thereof are those which contain from about 1 to about 20 carbon atoms, and more preferably those which contain from about 1 to about 10 carbon atoms.

The polymers which contain as at least a major portion thereof polymer units of formulas I, II, and III contain diphenoquinone units which are either recurring or randomly positioned along the polymer chain as a result of the state of oxidation of the redox polymer functional groups. Also, diphenoquinone polymers containing units of formulas I, II or III also contain as at least a minor portion thereof diphenohydroquinone units or diphenosemiquinone units. Furthermore, the diphenoquinone polymers can contain up to as much as about 100% diphenoquinone units of formulas I, II or III, and mixtures thereof.

In general, the novel oxidation-reduction diphenohydroquinone polymers comprise compositions of matter which contain as at least the major portion thereof diphenohydroquinone nuclei units selected from the group consisting of the formulas:

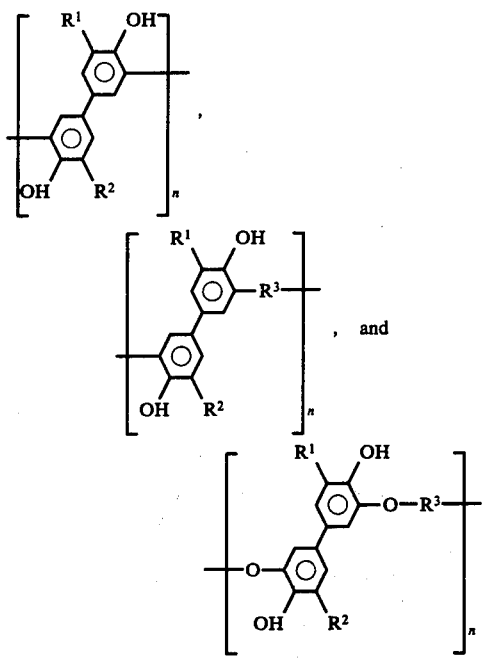

wherein $R^1$, $R^2$, $R^3$ and $n$ are the same as defined hereinbefore.

The polymers which contain as at least a major portion thereof polymer units of formulas IV, V and VI contain diphenohydroquinone units which are either recurring or randomly positioned along this polymer chain as a result of the state of oxidation of the redox polymer functional groups. Additionally, the diphenohydroquinone polymers containing units of formulas IV, V or VI also contain as at least a minor portion thereof diphenoquinone or diphenosemiquinone units. Furthermore, the diphenohydroquinone polymers can contain up to as much as about 100% diphenohydroquinone units of formulas IV, V or VI and mixtures thereof.

In addition to the novel polymers having the nuclei units of the formulas I through VI which can contain either diphenoquinone units or diphenohydroquinone units or mixtures thereof in the skeletal chain of the polymeric material, additional novel compositions of my invention comprise: (A) polymers prepared by the dehydroxylation of the novel oxidation-reduction diphenohydroquinone polymers wherein at least a portion of the hydroxyl groups are removed from the diphenohydroquinone nuclei, and (B) polymers which result from at least a partial dealkylation of the aforementioned dehydroxylated diphenohydroquinone polymers.

The dehydroxylated diphenohydroquinone polymers comprise compositions of matter which contain as at least a portion thereof diphenylene or diphenylenedioxy nuclei units selected from the group consisting of the formulas:

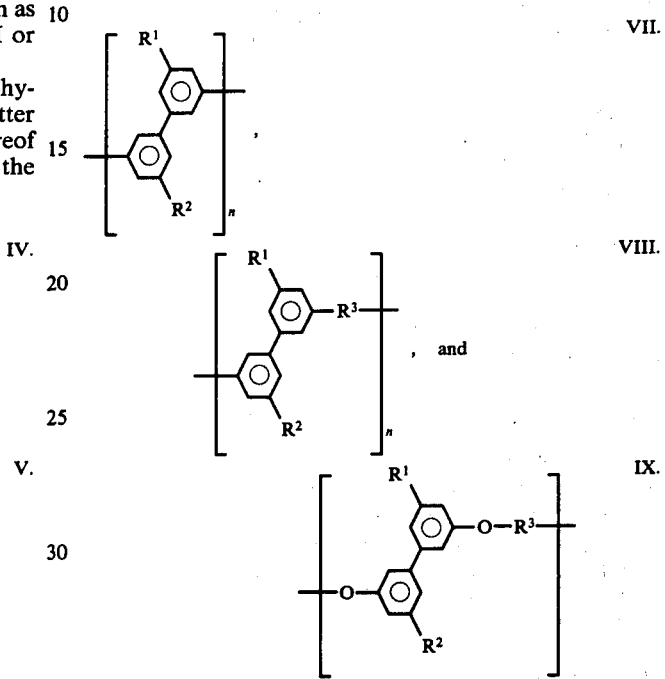

wherein $R^1$, $R^2$, $R^3$ and $n$ are the same as defined hereinbefore.

The dealkylated dehydroxylated diphenohydroquinone polymers comprise compositions of matter which contain as at least a portion thereof diphenylene or diphenylenedioxy nuclei units selected from the group consisting of the formulas:

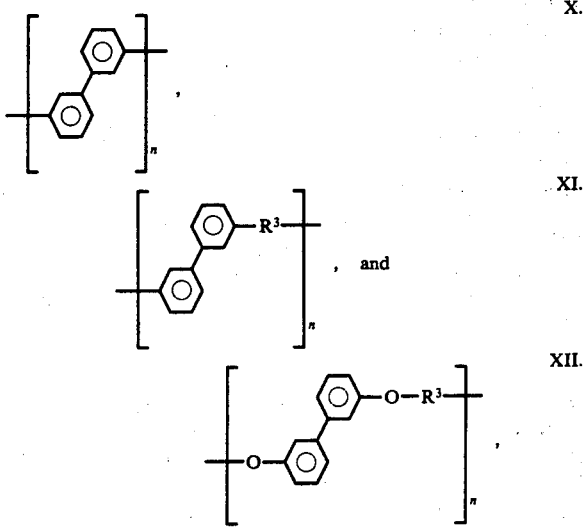

wherein $R^3$ and $n$ are the same as defined hereinbefore.

The polymers of formula I can be prepared from suitable monomeric reactants by any method well-known to the art. Examples of suitable monomeric reactants include diphenoquinones of the formula:

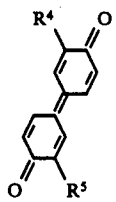
XIII.

wherein $R^4$ and $R^5$ are selected from the group consisting of α-carbon atom alkyl, alkoxy, aryl, aryloxy and combinations thereof. Specific methods for the preparation of the diphenoquinone monomeric reactants are disclosed in my U.S. Pat. No. 3,306,875, which is included herein by reference. Other suitable means for the preparation of the monomeric reactants of formula XIII include such reactions as the alkylation of 4,4'-dihydroxybiphenyl carried out in the presence of a suitable solvent such as dimethyl cellosolve saturated with boron trifluoride ($BF_3$).

The polymers of formulas I, II and III can be prepared from diphenol monomer reactants having the following formula:

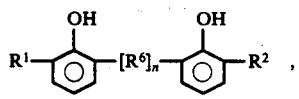
XIV.

wherein $R^1$ and $R^2$ are the same as defined hereinbefore, and $R^6$ is selected from the group consisting of alkylene, arylene, dioxyalkylene, dioxyarylene, and combinations thereof, and n is a positive integer of from 0 to 30, or more. Among the preferred monomeric reactants of formula XIV are those which are prepared by the alkylation of quaterphenyldiphenol (also known as diphenyl-quaterphenyl-diols). The preparation of the diphenyl-quaterphenyl-diols by methods well-known to the art is fully described in my U.S. Pat. No. 3,673,219 which is hereby incorporated by reference. Other means of preparing reactants of formula XIV include the reaction products of polyalkylenedihalides, e.g. polymethylenedihalides containing two functional groups, $(CH_2)_nX_2$, where X is a halogen, an n is a whole number of at least 1 and polyhydricphenols having at least one hydrocarbon substituent ortho to at least one of the hydroxyl groups and wherein the hydrocarbon substituent is selected from the group consisting of acyclic and cyclic hydrocarbon radicals. Illustrative of the polyalkylenedihalides include such compounds as trimethylenedibromide, tetramethylenedibromide, pentamethylenedibromide, hexamethylenedibromide, etc. Representative of the polyhydric phenols having hydrocarbon substituents ortho to at least one of the polyhydroxyl groups are such compounds as 3-methylcatechol, 3-tertiarybutylmethylcatechol, 3-cyclohexylmethylcatechol, 4-cyclohexylcatechol, 3-phenylcatechol, etc.

The polymerization of the diphenoquinone monomer reactants of formula XIII can be carried out under thermal polymerization conditions by simply heating the monomer. In general, the polymerizations are polyaddition reactions in which the propagating species is a diradical

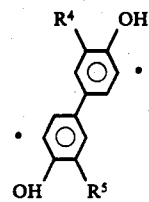

formed by rearrangement of the diphenoquinone (XIII) which combines to form the polymeric diphenohydroquinone (IV). In general, the polymerization reactions can be carried out in any homogeneous reaction media at temperatures which are lower than the polymers decomposition temperatures. In general, this propagation can be carried at temperatures in the range of from about 50° to about 300° C., and preferably are carried out within the temperatures range of from about 100° to about 200° C. Any solvent can be employed which provides a homogeneous solvent media for the diphenolquinone reactant, and, if desired, the polymer as formed. Representative solvents which can be employed include organic solvents, such as ketones, aromatic hydrocarbons, chlorohydrocarbons, nitrohydrocarbons, ethers, etc. If it is desirable to cause the polymer to precipitate from the reaction medium, it may be essential to use low molecular solvents such as toluene, xylene, methanol, chloroform, or nitrobenzene as the reaction solvent.

The polymerization of the diphenol monomer reactants of formula XIV in the formation of polymer compositions containing formulas II and III nuclei can be prepared in accordance with the process described hereinafter. Essentially, this process comprises contacting a diphenol XIV monomer reactant (hereinafter sometimes referred to as a diphenol XIV reactant) with oxygen in the presence of a dissolved oxygen-carrying intermediate comprising a tertiary amine-basic cupric salt complex. These tertiary amino-basic cupric salt complexes comprise any of those disclosed in my U.S. Pat. No. 3,306,875 which is hereby incorporated by reference for the general details of their constituents and methods of preparation. Typical examples of copper salts which can be employed to form the complexes are cuprous chloride, cupric chloride, cuprous bromide, cupric bromide, cuprous sulfate, cupric sulfate, etc. Typical examples of tertiary amines which can be employed to form the complexes are trimethylamine, triethylamine, tripropylamine, tributylamine, benzyldimethylamine, dimethylcyclohexylamine, 1-dimethylamine-2-phenylpropane, etc. Polymerization of formula XIV monomers to polymers containing formulas II and III nuclei can also be carried out using metal oxide catalyst systems, such as silver oxide, manganese dioxide, nickel dioxide as well as lead dioxide, etc., instead of the oxygen-carrying tertiary amine-basic cupric salts complex catalyst systems referenced hereinbefore.

In general, the polymerization reactions can be carried out in any homogeneous reaction medium at temperatures and pressures which permit the oxidative coupling of the diphenol XIV reactants and continuing propagation of the diphenoquinone nuclei units of formulas II and III. Further, in general, temperatures within the range of from ambient room temperatures of about 20° C. to temperatures as high as about 300° C. can be employed, however presently preferably temperatures are within the range of from about 20° to about 100° C. Any solvent can be employed in the process of propagating diphenol XIV reactants including those solvents described hereinbefore as representative solvents for the monomeric diphenol XIII reactant, as well as combinations of large excesses of amine derived from the catalyst complex and the aforesaid solvents, providing that the solvents present within the polymerization reaction environment do not interfere or enter into the oxidative coupling rearrangement polymerization reaction. Since the solvent does not need to act as a solvent for the polymer, it may be desirable sometimes to use a solvent system such as toluene, xylene, chloroform, nitrobenzene, etc., to cause the polymer to precipitate from the reaction medium while permitting the lower molecular weight polymers and monomer XIV reactants to remain in solution until they form the desired higher molecular polymeric materials.

The polymers containing formulas I, II or III nuclei units can be reduced to form polymers containing the formulas IV, V or VI nuclei units by any means known to the art. In general, reduction can be carried out by contacting a polymer structure containing diphenoquinone units of I, II or III with a suitable reducing agent such as hydrazine, hypophosphorous acid, triose reductone, ascorbic acid, as well as any of the effective organic phase reducing agents disclosed in U.S. application Ser. No. 431,129, filed Jan. 7, 1974, now abandoned and copending Ser. No. 649,981, filed Jan. 19, 1976 which is a continuation-in-part of 431,129, assigned to the same assignee of record as the assignee of record of this application. Such effective reducing agents include tetrapentylphosphonium dithionate, tricaprylylmonomethylammonium dithionite, trioctadecylsulfonium borohydride and the like. Reduction of the diphenoquinone nuclei units to diphenohydroquinone nuclei units can also be readily carried out by contacting the nuclei I, II, III units or mixtures thereof with hydrogen in the presence of palladium or platinum at room temperatures and at 30–60 psi pressures. The reduction of the polydiphenoquinones to polydiphenohydroquinones can also be carried out during regeneration of cation exchange properties of ammonium, alkali metal, alkaline earth or other metal salt substituents associated with the anionic forms of formulas I, II, III polymeric nuclei units.

Any of the usual oxidizing agents can be employed to convert the diphenohydroquinone polymers to their corresponding diphenoquinone oxidation state or any desired semiquinone or semihydroquinone oxidation state. Representative of such oxidizing agents are silver peroxide, nickel peroxide, manganese dioxide, organic peroxides, chromic acid, ferric chloride, lead tetra-acetate, etc. Another means of oxidizing these diphenohydroquinone polymers comprises the use of an oxidation catalyst permitting air or other oxygen containing gas to be used as the oxidizing agent. Typical useful catalysts for such a reaction are the basic cupric complex catalysts disclosed in my U.S. Pat. Nos. 3,210,384; 3,306,874; 3,306,875 and the Blanchard et al. U.S. Pat. Nos. 3,319,625; 3,219,626; 3,259,629 and 3,277,095, all of which are hereby incorporated by reference. I have found that the same reaction conditions and catalysts disclosed in these patents are equally applicable to the oxidation of nuclei of IV, V or VI back to nuclei of I, or II, or III.

The dehydroxylated polymers containing the diphenylene or diphenylenedioxy nuclei represented by formulas VII, VIII and IX hereinbefore can be prepared by hydrogenolysis of formulas IV, V or VI nuclei polymers. Suitable hydrogenolysis reaction comprise contacting polymer IV, V or VI nuclei with any polycyclic aromatic compounds having phenyl or phenylene ring structures associated with cyclohexyl ring substituents. I have found that the use of such polycyclic aromatic compounds preferentially removes the hydroxyl group from the polymers containing the IV, V or VI nuclei units in direct proportion to the stoichiometric amounts of cyclohexyl hydrogen donors associated with the polycyclic aromatic compounds. Accordingly, to avoid hydrogenation of the unsaturated rings associated with the nuclei of IV, V or VI, the amount of hydrogen donors associated with the cyclohexyl substituent rings should be no greater than the stoichiometric amounts necessary to supply the amount of hydrogen required to remove all of the hydroxyl groups present in any of the reactants. Representative cyclohexyl substituted polycyclic aromatic compounds include any of the cyclohexyl substituted hydrogen donors set out in U.S. Pat. No. 3,415,896 which include such compounds as 1,3-dicyclohexylbenzene, 2,4-dicyclohexyl-3-methylphenol, 6-cyclohexyl-2,4-dimethylphenol and 4'-cyclohexyl-m-terphenyl (4'-cyclohexyl-3-phenylbiphenyl), etc., all of which are hereby incorporated by reference.

Hydrogenolysis of formulas IV, V or VI nuclei by contact with the polycyclic aromatic compounds containing the cyclohexyl hydrogen donors are advantageously carried out in the liquid phase at a temperature of about 300–500° C. Autogeneous pressures are generally effective, however, higher pressures can be employed but generally offer no advantage. For convenience and safety in avoiding possible explosive oxidative reactions, it is preferred that the hydrogenolysis reaction be carried out in the presence of an inert atmosphere by means of flushing and blanketing the reaction media with an inert gas, for example, nitrogen prior to initiation of the hydrogenolysis reaction. A hydrogenation catalyst must be employed in the reaction in order for the hydrogenolysis reaction to proceed readily. Although various hydrogenation catalysts can be used, the most effective catalysts are nickel, platinum and palladium. Of these, palladium is preferred. The catalyst can be supported on various inner carriers generally effective with hydrogenation catalysts, particularly effective are hydrogenation catalyst carriers known to be effective as dehydration catalyst carriers, such as aluminum oxide. The amount of catalyst employed is not critical, but generally is effective if within the range of from 0.001 to 10% by weight of the metal catalyst based on the weight of the diphenohydroquinone polymer. Since the reactants and the products are generally stable liquids at hydrogenolysis reaction temperatures, no solvent is necessary, although an inert solvent, such as benzene, biphenyl, terphenyl, etc., can be used if desired. In general, the reaction conditions and catalysts disclosed in my U.S. Pat. No. 3,415,896 are equally applicable to the hydrogenolysis of polydiphenylhydroquinone polymers.

Other suitable means of dehydroxylating the polymers containing Formulas VII, VIII or IX nuclei include hydrogenolysis of polymers of Formulas IV, V or VI nuclei in the presence of effective hydrogenolysis catalysts, such as mixtures of molybdenum dioxide and molybdenum trioxide (in the presence or absence of small amounts of copper or chromium oxides), molybdenum disulfide, phosphorus trisulfide, etc.

The dealkylated polymers containing the diphenylene or diphenylenedioxy nuclei units of Formulas X, XI and XII can be prepared by the dealkylation of polymers containing nuclei units VII, VIII or IX in accordance with the methods set out hereafter.

In general, the dealkylation reaction can be carried out in accordance with the dealkylation conditions associated with the dealkylation of phenols well-known to the art and described more fully in U.S. Pat. No. 3,091,646 issued May 28, 1963. The dealkylation is carried out in a suitable solvent medium wherein polymeric material and dealkylation catalysts are contacted at atmospheric or subatmospheric pressures and at temperatures within the range of from about 100° C. to about 300° C. or higher. Suitable dealkylation catalysts include the phenoxy derivatives of such elements as aluminum, magnesium, zirconium, etc., where the phenoxy moiety may be the phenoxy itself, the cresoxy radical, the xylyloxy radical, etc. The preferred phenoxy derivatives are those of aluminum and magnesium, with aluminum being somewhat more preferred than that of magnesium. The dealkylation reaction can also employ as catalysts such well-known catalytic dealkylation agents as acids or acid salts, for example, sulfuric acid, acidified clays, aluminum chloride, zinc chloride, etc.

In order that those skilled in the art may better understand the invention, the following examples are given which are illustrated by the practice of the invention, however are not limited to the invention thereto. In all the examples, all parts are by weight unless stated otherwise.

EXAMPLE I

A 250 ml. flask was charged with 5 grams of 3,3'-di-t-butyl diphenoquinone and 50 ml. of chlorobenzene. 5 mg. of copper was added as a catalyst. The reaction mixture was heated to reflux under nitrogen for 12 hours. The reaction mixture containing diphenohydroquinone polymer nuclei units of 1,1'-bis)3,3'-di-tert-butyl 4,4'-hydroxybenzenetetrayl-1,1',3,3',4,4',5,5') of the formula

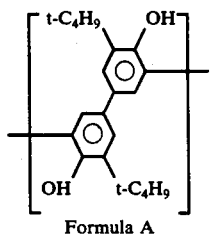

Formula A was separated from the reaction mixture by precipitating the polymer into a normal hexane solution containing 5 drops of 86% hydrazine hydrate. A yellow diphenohydroquinone polymer containing the polymer nuclei 1,1'-bis(3,3'-di-tert-butyl 4,4'-hydroxybenzenetetrayl-1,1',3,3',4,4',5,5') of the Formula C (illustrated hereafter) was precipitated from the reaction media collected and dried. The polymer was found to have reversible oxidation reduction properties. The molecular weight of the polymer was determined to be about 4,700 by osmotic pressure measurements.

The polymerization and reduction of the 3,3'-di-tert-butyl diphenoquinone in the preparation of polymers containing diphenohydroquinone units is illustrated by the following equation. In the following equation, $n$ has a value of about 15.

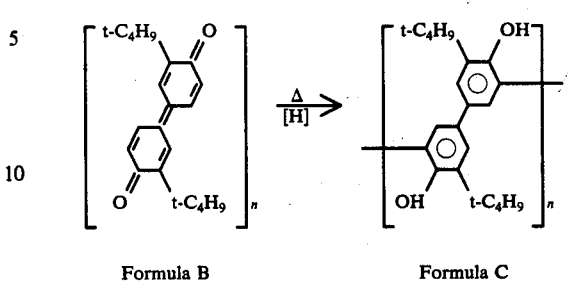

Formula B      Formula C

EXAMPLE II

Two grams of 3,3'-diphenyl-4,4'-diphenoquinone and 20 ml. of chlorobenzene were charged into a 50 ml. flask. The reaction mixture was heated to reflux under nitrogen for 10 hours and the resulting polymer containing diphenoquinone nuclei units of 1,1'-bis(3,3'-diphenyl 4,4'-hydroxybenzenetetryl-1,1',3,3', 4,4',5,5') of the formula

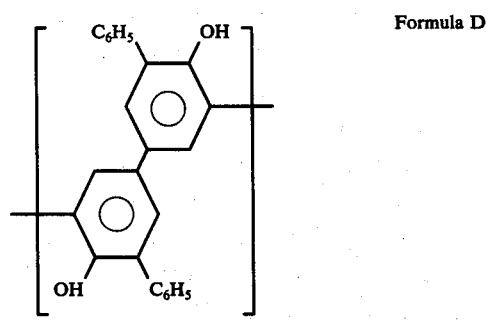

Formula D was isolated from the reaction mixture by precipitation from methanol. The precipitate had a molecular weight of about 4,300 as determined by gel permeation chromatography, and a D.P. of about 10-13. the polymerization of the 3,3'-diphenyl-4,4'-diphenoquinone in the preparation of the polydiphenylquinone is illustrated by the following equation wherein $n$ has a value of about 13.

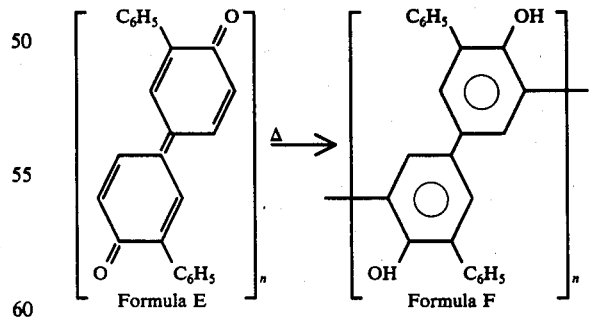

Formula E      Formula F

EXAMPLE III 90 grams of ortho-phenylphenol and 2 grams of aluminum foil were charged to a 300 ml. flask. The mixture was heated at 215° C. until all of the aluminum had dissolved and then cooled. 32 grams of 3',3'-bis(2-hydroxyl 5'-phenyl biphenyl) of the formula

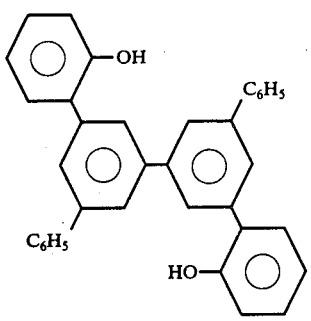

Formula G

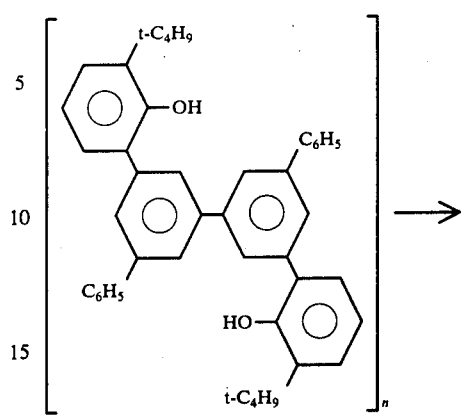

Formula I was charged to the flask. Isobutylene was added at a rate which maintained continual reflux at a temperature range of about 70°-75° C. 45 grams of isobutylene was absorbed by the reaction mixture over a 10 hour period. The reaction mixture was diluted with ether, washed with dilute hydrochloric acid to remove aluminum salts. The ether was evaporated and the residue distilled to remove the ortho-phenylphenol and 2-tert-butyl 6-phenylphenol (86°-110°/0.1 millimeters). The residue was dissolved in ether and washed with Claisen's alkali to remove unalkylated product. The resulting product was dissolved in benzene and passed through an alumina column. The first fractions eluded gave a viscous yellow oil which crystallized. Recrystallization from heptene ethylacetate gave colorless crystals having a melting point of 230° to 233° C.

The resulting product 3,3'-bis(2-hydroxyl 3-tert-butyl-5'-phenyl biphenyl) of the Formula H (illustrated hereafter) was confirmed by means of the elemental, infrared, and nmr data set out in Table I hereafter:

TABLE I

| Elemental Analyses (%) | Formula H |
| --- | --- |
| Calculated | |
| C | 87.67 |
| H | 7.02 |
| Found | |
| C | 87.4 |
| H | 7.1 |
| Infrared Intensity | |
| hydroxy (3525 cm$^{-1}$) | strong |
| hydroxy (3500 cm$^{-1}$) | strong |
| nmr | |
| t-butyl (1.45 ppm, 18 protons) | singlet |
| phenolic hydroxyl (5.50 ppm, 2 protons) | singlet | was polymerized in accordance with oxidative coupling reaction conditions described hereafter in the preparation of diphenoquinone polymers in accordance with the following equation:

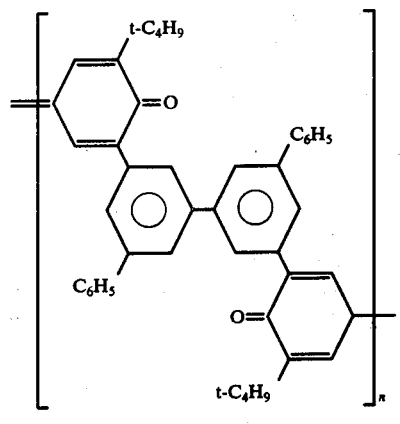

Formula J

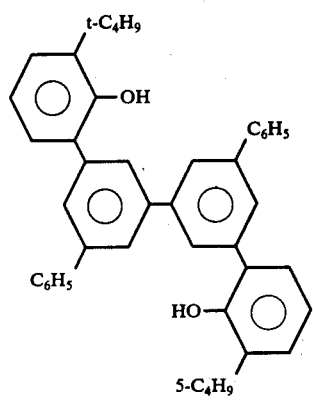

Formula H 0.25 gram of 3',3'-bis(2-hydroxy-3-tert-butyl-5'-phenyl biphenyl) was mixed with 5 ml. of pyridine, 0.5 ml. of tetramethylethylenediamine, and 0.05 gram of cuprous chloride. Oxygen was passed through the reaction mixture for 1 hour and 20 minutes and the polymer of Formula J was precipitated in methyl alcohol, filtered, dissolved in chloroform, filtered in methyl alcohol and redissolved in chloroform and cast as a film.

The polymer of Formula K was dissolved in chloroform, reduced at room temperature with hydrazine hydrate to form polymer L in accordance with the following equation:

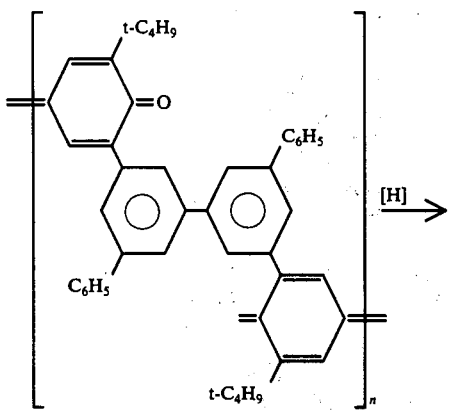

Formula K

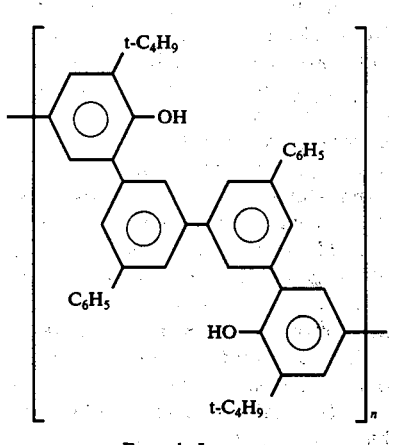

Formula L

The polymers of Formulas K and L were confirmed by means of the elmental, infrared, UV and visible spectra, and gel permeation data set out in Table II hereafter:

TABLE II

|  | Formula K | Formula L |
|---|---|---|
| Elemental Analyses (%) | | |
| Calculated | | |
| C | 87.8 | 87.8 |
| H | 6.8 | 6.8 |
| Found | | |
| C | 85.9 | 87.0 |
| H | 6.8 | 6.7 |
| Infrared Intensity | | |
| hydroxy (3545 cm$^{-1}$) | | strong |
| carbonyl (1660, 1630) | medium | |
| UV and Visible Spectra (absorbance) | | |
| 252 mµ | 0.90 (8 mg/l) | 0.82 (5.3 mg/l) |
| 444 mµ | 0.87 (15 mg/l) | |
| Gel Permeation (based on polystyrene calibration) | | |
| Mol. Wt. | 30,000 | |
| n (units) | | ≈40 |

EXAMPLE IV

A 250 ml. flask was charged with 100 ml. nitrobenzene, 30 ml. of 2,6-lutidine and 1 gram of cuprous chloride. The mixture was heated to approximately 90° C. with oxygen passing through the mixture. 2 grams of bis(2-hydroxy-3-methyl-phenoxy)-1,4-butane was charged to the reaction mixture. After 15 minutes, the reaction mixture was precipitated in methanol and a red-brown solid polymer was filtered and dried. The polymer product of the Formula M (illustrated hereafter) did not melt up to a temperature of 300° C. A suspension of the polymer in methanol was reduced with hydrazine to a polymer product of the Formula N (illustrated hereafter).

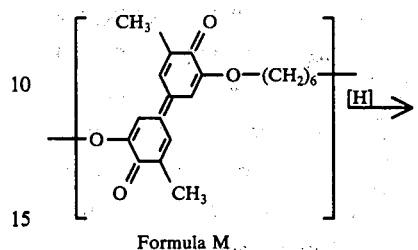

Formula M

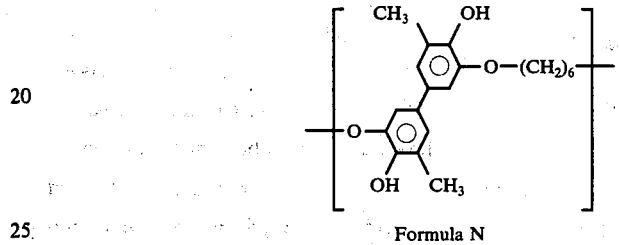

Formula N

EXAMPLE V 2 grams of 3,3'-diphenyldiphenoquinone in 3 ml. of ortho-dichlorobenzene in a Carius tube was heated at 150° C. for 20 hours, cooled, and the resulting polymer was precipitated in methanol. Based on gel permeation chromatography a polymer molecular weight of approximately 2,000 was established.

In addition to the redox capacity of the redox diphenoquinone-diphenoquinone polymers of this invention, anion and cation exchange groups can be placed on the polymeric matrices in order to adjust the hydrophilic character of the resins. Accordingly, redox polymers which are soluble in water and acid as well as polar solvents can be prepared readily from polymers containing the Formula I, II or III nuclei units.

The redox polymers of my invention are particularly valuable in commercial redox processes which are most effectively carried out at elevated temperatures since these polymers are thermally stable and retain their redox as well as their ion exchange properties at elevated temperatures, such as temperatures within the range of from about 150° C. to about 300° C., or even higher. In general, redox polymer which contain Formulas I, II, III, IV, V or VI nuclei units are thermally stable and redox effective at temperatures: up to about 150° C. or higher providing that the R$^1$ and R$^2$ substituents are mostly, i.e. at least a major portion, aliphatic hydrocarbon radicals, and up to about 300° C., or even higher providing that the R$^1$ and R$^2$ substituents are mostly aromatic hydrocarbon radicals.

The redox polymers of my invention have the ability to be employed in a wide variety of chemical applications including their use as oxidizing and reducing agents, such as their use to remove dissolved oxygen from water; as antioxidants to delay or inhibit deterioration due to oxidation in rubbers, gums, unsaturated fatty oils, such as vegetable oils, essential oils, petroleum products, soaps, aldehydes, surface-coating resins such as textile resins, paper coatings and binders, paints and in drying oils; to remove or to convert for subsequent removal, trace quantities of peroxide or oxidants in monomer solutions where peroxide formation may occur or where oxidants will come in contact with easily oxidized materials; to serve as models for biochemical systems; to treat gastrointentinal ulcers; as nondiffusing reducing agents for photographic color emulsions; as depolarizing masses for primary and secondary electrical cells; as stabilizers in dielectric compositions for capacitors, transformers, circuit breakers and other devices; as a semiconductor polymeric ingredient, as well as an ion exchange resin.

Obviously, other modifications and variations of the present invention are possible in light of the above teaching. It is, therefore, to be understood that changes may be made in the particular embodiments of the invention described which are within the full intended scope of the invention as defined by the appended claims.

What I claim as new and desire to secure by Letters Patent in the United States is:

1. A homopolymer comprising recurring units of the formula:

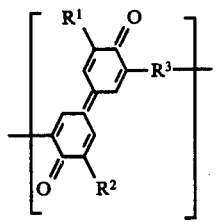

where independently each $R^1$ and $R^2$ is selected from monovalent acyclic or cyclic hydrocarbon radicals and $R^3$ is selected from divalent acyclic or cyclic hydrocarbon radicals.

2. A homopolymer comprising recurring units of the formula:

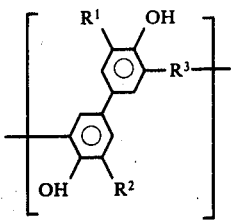

where independently each $R^1$ and $R^2$ is selected from acyclic or cyclic hydrocarbon radicals and $R^3$ is selected from divalent acyclic or cyclic hydrocarbon radicals.

3. The claim 1 polymer, where each $R^1$, $R^2$ and $R^3$ contains from about 1-20 carbon atoms, $R^1$ and $R^2$ are selected from alkyl, cycloalkyl, alkoxy, cycloalkoxy, aryl, aryloxy or combinations thereof, and $R^3$ is selected from alkylene, alkylidene, cycloakylene, cycloalkylidene, arylene, or combinations thereof.

4. The claim 2 polymer, where each $R^1$, $R^2$ and $R^3$ contains from about 1-20 carbon atoms, $R^1$ and $R^2$ are selected from alkyl, cycloalkyl, alkoxy, cycloalkoxy, aryl, aryloxy or combinations thereof, and $R^3$ is selected from alkylene, alkylidene, cycloakylene, cycloalkylidene, arylene, or combinations thereof.

5. The claim 3 polymer, where $R^1$ and $R^2$ are tertiary alkyl radicals and $R^3$ is an arylene radical.

6. the claim 4 polymer, where $R^1$ and $R^2$ are tertiary alkyl radicals and $R^3$ is an arylene radical.

7. The claim 5 polymer, where $R^1$ and $R^2$ are tertiary butyl radicals and $R^3$ is an m-phenylphenyl radical.

8. The claim 6 polymer, where $R^1$ and $R^2$ are tertiary butyl radicals and $R^3$ is an m-phenylphenyl radical.

9. A process for the preparation of claim 1 polymer, which comprises contacting a diphenol monomer reactant having the formula:

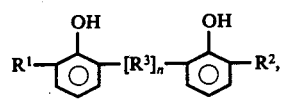

where $R^1$, $R^2$ and $R^3$ are as defined hereinbefore, with oxygen in the presence of a tertiary amine-basic cupric salt complex.

10. The claim 9 process, carried out at temperatures of from about 20° to about 100° C.

11. A process for the preparation of the claim 2 polymer, which comprises contacting the polymer of claim 1 with a suitable reducing agent.

* * * * *